(12) United States Patent
Park et al.

(10) Patent No.: US 8,065,513 B2
(45) Date of Patent: Nov. 22, 2011

(54) METHOD AND APPARATUS FOR BOOTING HOST

(75) Inventors: Young-min Park, Seongnam-si (KR); Jun-ho Jang, Hwaseong-si (KR); Gyung-pyo Hong, Yongin-si (KR); Keum-yong Oh, Yongin-si (KR); Hae-su Gwon, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 12/266,723

(22) Filed: Nov. 7, 2008

(65) Prior Publication Data

US 2009/0125710 A1    May 14, 2009

Related U.S. Application Data

(60) Provisional application No. 60/987,169, filed on Nov. 12, 2007.

(30) Foreign Application Priority Data

Mar. 28, 2008   (KR) ........................ 10-2008-0029325

(51) Int. Cl.
*G06F 9/00*   (2006.01)
*G06F 9/24*   (2006.01)
*G06F 15/177*   (2006.01)

(52) U.S. Cl. ................................................ 713/2; 713/1
(58) Field of Classification Search .................. 713/1, 2
See application file for complete search history.

(56) References Cited

U.S. PATENT DOCUMENTS

2004/0123313 A1   6/2004   Koo et al.

FOREIGN PATENT DOCUMENTS

| KR | 10-2006-0116967 A | 11/2006 |
| KR | 10-2007-0051176 A | 5/2007 |
| KR | 10-2007-0103211 A | 10/2007 |

*Primary Examiner* — Vincent Tran
(74) *Attorney, Agent, or Firm* — Sughrue Mion, PLLC

(57) ABSTRACT

Provided are a method and a device for booting a host embodying a downloadable conditional access system (DCAS), wherein one of a plurality of pre-determined booting modes is decided as a booting mode of the host based on first information indicating whether a host can communicate with a broadcasting service provider and second information indicating whether a software-based security client providing information required for decrypting broadcasting data is installed to a hardware-based security module connected to the host, and the host is booted in the decided booting mode.

21 Claims, 5 Drawing Sheets

METHOD AND APPARATUS FOR BOOTING HOST

CROSS-REFERENCE TO RELATED PATENT APPLICATION

This application claims the benefits of Korean Patent Application No. 10-2008-0029325, filed on Mar. 28, 2008, in the Korean Intellectual Property Office, and the benefit of U.S. Provisional Patent Application No. 60/987,169, filed on Nov. 12, 2007, in the U.S. Patent and Trademark Office, the disclosures of which is incorporated herein in its entirety by reference.

BACKGROUND OF THE INVENTION

1. Field of the Invention

Methods and apparatuses consistent with the present invention relate to booting a host, and more particularly, to booting a host in which a downloadable conditional access system (DCAS) is embodied.

2. Description of the Related Art

A broadcasting service provider limits the number of channels a broadcasting service subscriber can watch according to a service subscription fee the broadcasting service subscriber pays. In other words, a broadcasting service provider differentiates a broadcasting service for all broadcasting service subscribers and a broadcasting service only for broadcasting service subscribers paying an additional broadcasting service subscription fee. In the former case, the broadcasting service provider transmits a part of broadcasting data without encryption such that all broadcasting service subscribers can receive a broadcasting service regarding the broadcasting data. In the latter case, the broadcasting service provider transmits the other part of broadcasting data with encryption such that only the broadcasting service subscribers who paid the additional broadcasting service subscription fee can receive a broadcasting service regarding the encrypted broadcasting data.

A conditional access system (CAS) is the most typical system for controlling channels a broadcasting service subscriber can watch. To embody the CAS, a broadcasting service provider encrypts a part of broadcasting data and transmits the encrypted broadcasting data. In this case, an entitlement management message (EMM) and an entitlement control message (ECM) are transmitted along with the encrypted broadcasting data.

A broadcasting reception device of a broadcasting service subscriber who pays an additional broadcasting service subscription fee includes a security module capable of decrypting the encrypted broadcasting data. The security module receives the EMM data and verifies whether the broadcasting reception device is authorized to receive the broadcasting data. For example, the security module can verify whether the broadcasting reception device is used by an authorized broadcasting service subscriber or not by comparing a serial number of the broadcasting reception device and the EMM data. Once the broadcasting reception device is verified as an authorized device, the security module verifies whether the broadcasting reception device is authorized to receive the encrypted broadcasting data or not by using the ECM data. To this end, the security module generates a decryption key by using a verification key, which is obtained from the EMM data, and the ECM data, only if the broadcasting reception device is authorized to receive the encrypted broadcasting data. The broadcasting reception device decrypts the encrypted broadcasting data so that the broadcasting service subscriber can receive a broadcasting service regarding to the encrypted broadcasting data.

Meanwhile, it is prescribed in an open cable application platform (OCAP), which defines the standards of cable broadcasting, that it is required to use a cable card as a security device. However, such cable card is expensive and difficult to be upgraded. To resolve the problems of such cable card, a downloadable CAS (DCAS) is currently under development. In the DCAS, the tasks for a conventional cable card are distributed to a hardware-based security module and a software-based client. The hardware-based security module is included in a broadcasting reception device, whereas the software-based client can be downloaded from a broadcasting service provider.

In the DCAS, functions provided by a broadcasting reception device vary according to a condition of the broadcasting reception device. Thus, it is effective to switch a booting method or a booting sequence according to a condition of the broadcasting reception device. However, an initial boot-up of a broadcasting reception device has been performed inefficiently in a conventional DCAS without considering a condition of the broadcasting reception device.

SUMMARY OF THE INVENTION

The present invention provides a method and a device for booting a downloadable conditional access system (DCAS) host efficiently.

According to an aspect of the present invention, there is provided a method of booting a host providing broadcasting service, the method including deciding one of a plurality of pre-determined booting modes as a booting mode of the host based on a first information indicating whether a host can communicate with the broadcasting service provider and second information indicating whether a software-based security client providing information required for decrypting broadcasting data is installed to a hardware-based security module connected to the host, and booting the host in the decided booting mode.

The booting modes may include one or more of a first booting mode for a case in which communication cannot be established between the broadcasting service provider and the host, a second booting mode for a case in which communication between the broadcasting service provider and the host can be established and the security client is not installed, and a third booting mode for a case in which communication between the broadcasting service provider and the host can be established and the security client is installed.

When the host is decided to be booted in either the second booting mode or the third booting mode, the booting of the host may include initializing a communication interface between the host and the security module, determining whether version of internal software required for operating the host is the latest or not, and upgrading the internal software by using data provided by the broadcasting service provider if the version of the internal software is not the latest.

If the host is decided to be booted in the third booting mode, the booting of the host may further include receiving a control signal for managing the installed security client, and performing one or more of upgrading the installed security client, installing a new security client distributed by the broadcasting service provider, and removing the installed security client, based on the control signal.

If the host is decided to be booted in the second booting mode, the booting of the host may further include determining whether the host is authorized to receive encrypted broadcasting data provided by the broadcasting service provider and downloading a new security client distributed by the broadcasting service provider and installing the new security client to the security module in case where the host is determined as authorized to receive the encrypted data.

The booting of the host may further include receiving information regarding applications which will be selectively executed by the host, receiving a monitoring application controlling other applications based on the information regarding the applications, and executing the received monitoring application.

The information regarding the applications may be included in a XAIT (extension application information table) and received by XAIT.

The booting of the host may further include executing basic applications supporting functions required for providing the broadcasting service.

The host is connected to the broadcasting service provider via a cable network, and the security client may be a CAS (conditional access system) client for embodying a CAS.

The security module may be installed inside the host as a chipset.

According to another aspect of the present invention, there is provided a device for booting a host providing broadcasting service, the device including a booting mode deciding unit deciding one of a plurality of pre-determined booting modes as a booting mode of the host based on first information indicating whether a host can communicate with the broadcasting service provider and second information indicating whether a software-based security client providing information required for decrypting broadcasting data is installed to a hardware-based security module connected to the host, and a booting unit booting the host in the decided booting mode.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
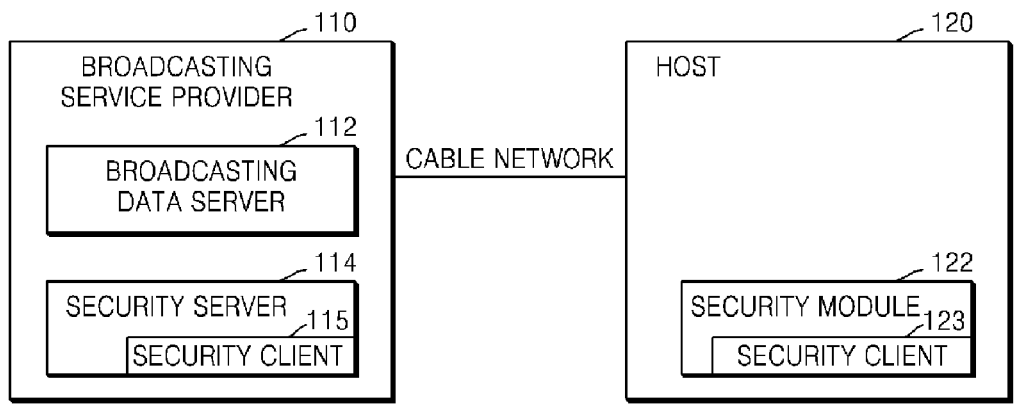
FIG. 1 is a diagram of a downloadable conditional access system (DCAS) according to an embodiment of the present invention.

FIG. 1 is a diagram of a downloadable conditional access system (DCAS) according to an embodiment of the present invention.

The DCAS 100 includes a broadcasting service provider 110 and a host 120.

The broadcasting service provider 110 includes a broadcasting data server 112, which transmits broadcasting data to the host 120, and a security server 114, which applies a security policy to the host 120.

The broadcasting data server 112 transmits broadcasting data for an audio/video (A/V) service, broadcasting data for a two-way service, broadcasting data regarding to an application execution, etc., to the host 120.

To provide different broadcasting services to different broadcasting service subscribers, the security server 114 encrypts a part of broadcasting data and transmits security policy information required for decrypting the encrypted broadcasting data to the host 120. The security policy information may include entitlement control message (ECM) data and entitlement management message (EMM) data.

The security server 114 includes software for decrypting encrypted broadcasting data; the software will be referred as a security client 115 hereinafter. The security client 115 is downloaded to the host 120 used by a broadcasting service subscriber who paid an additional broadcasting service subscription fee so that the broadcasting service subscriber can decrypt encrypted broadcasting data. Hereinafter, for convenience of explanation, a broadcasting service subscriber that pays an additional broadcasting service subscription fee for a higher grade broadcasting service will be referred as a high-grade broadcasting service subscriber, whereas a broadcasting service subscriber that pays only a basic broadcasting service subscription fee for a basic broadcasting service will be referred as a basic broadcasting service subscriber.

The broadcasting data and the security policy information are transmitted to the host 120 via a cable network.

If transmitted broadcasting data is unencrypted broadcasting data, the host 120 decodes and outputs the broadcasting data. However, if transmitted broadcasting data is encrypted broadcasting data, the host 120 decrypts the encrypted broadcasting data through decrypting operations performed by a security module 122 of the host 120, decodes the decrypted broadcasting data, and outputs the decoded broadcasting data.

The security module 122 may be embodied independent of the host 120, i.e., embodied independently as a USB device. Or, the security module 122 may be embodied within the host 120 as a chipset. The security module 122 performs message and data communication with other components within the host 120 via a communication interface within the host 120. Although the process capacity or the process magnitude of the security module 122 is very small as compared with a conventional cable card, the security module 122 applies the security policy by operating a security client 123 installed to the security module 122. If the security client 123 is not installed to the security module 122 within the host 120 of a high-grade broadcasting service subscriber, the security client 123 is downloaded from the broadcasting service provider 110 and is installed to the security module 122. Also, if the security client 123 needs to be upgraded or updated, the host 120 receives data required for the upgrade or update from the broadcasting service provider 110 and upgrades or updates the security client 123.

The security client 123 provides information required for decrypting encrypted broadcasting data provided by the broadcasting service provider 110. For example, in case of a conditional access system (CAS), the security client 123 generates a decryption key. The security client 123 can decrypt broadcasting data received from a corresponding broadcasting service provider 110 of the security client 123, but the security client 123 cannot decrypt broadcasting data received from other broadcasting service providers.

The host 120 has to perform predetermined operations to provide a broadcasting service to a broadcasting service subscriber. Hereinafter, the predetermined operations performed after a power is supplied to the host 120 or after rebooting of the host 120 is requested by rebooting an API such that the host 120 can provide a broadcasting service will be referred as a booting sequence. The booting sequence is required to vary according to type of a security module, which is a cable card or a DCAS, the host 120 employs. Particularly, in the DCAS 100, functions provided by the host 120 vary according to the conditions of the host 120. Examples of the conditions of the host 120 include whether the host 120 is connected to a cable network or not or whether the security client 123 installed to the security module 122) or not is usable. Thus, a booting sequence of the host 120 may vary according to the current conditions of the host 120.

Hereinafter, various booting sequences of the host 120 will be described, including a first booting sequence for a case in which the host 120 is not connected to a cable network, a second booting sequence for a case in which the host 120 is connected to the cable network but the security client 123 is not installed to the security module 122, and a third booting sequence for a case in which the host 120 is connected to the cable network and the security client 123 is installed to the security module 122.

Figure 2:
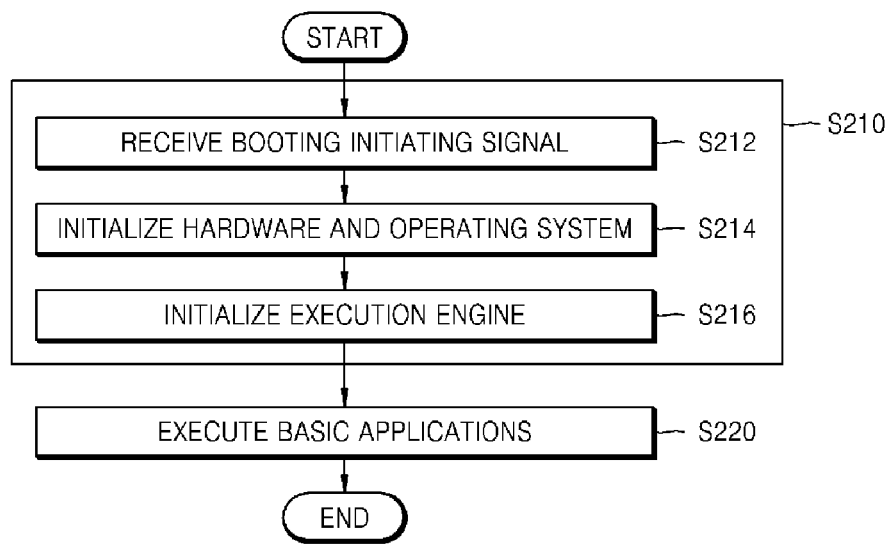
FIG. 2 is a flowchart of a host booting sequence according to an embodiment of the present invention.

FIG. 2 is a flowchart of a host booting sequence according to an embodiment of the present invention. A host is booted according to a first booting mode.

In operation S210, common booting operations, which are performed regardless of booting modes, are performed. Operation S210 may include operations S212 through S216.

In operation S212, a booting initiation signal is received. The booting initiation signal can be generated when either an external power is applied to the host or reboot by software is requested.

In operation S214, hardware and operating system in the host are initialized.

In operation S216, components and modules of an execution engine are initialized. The execution engine is an application for operating broadcasting software.

In operation S220, basic applications required by the host to provide basic functions are executed. The basic applications are either applications, prescribed by a manufacturer of the host, to be executed while the host is booted or applications received when the host is connected to a broadcasting service provider, and are autorun-capable and not relevant to broadcasting channels.

Figure 3:
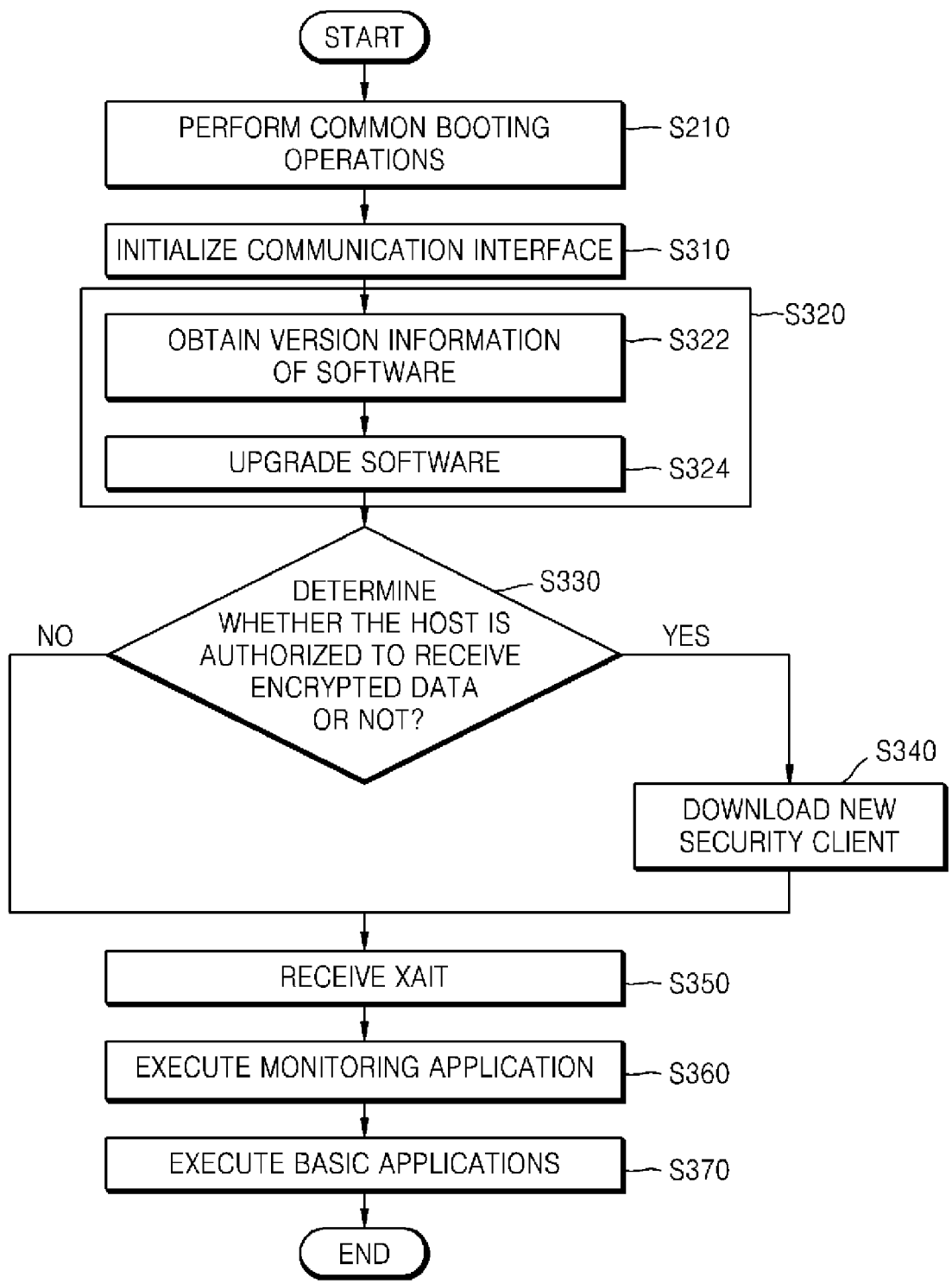
FIG. 3 is a flowchart of a host booting sequence according to another embodiment of the present invention.

FIG. 3 is a flowchart of a host booting sequence according to another embodiment of the present invention. In FIG. 2, the host is booted according to a second booting mode.

In operation S210, the common booting operations, which are performed regardless of booting modes, are performed. Thus, operation S210 may include operations S212 through S216 of FIG. 2.

In operation S310, a communication interface between the host and a security module is initialized. In other words, a low-level initialization of a DCAS/HOST interface is performed. Once operation S310 is performed, the host can communicate with the security module.

In operation S320, internal software is upgraded, wherein the internal software may be open cable application platform (OCAP) middleware required for operating the host; for example, OCAP 1.0 Implementation. Operation S320 may include operations S322 and S324.

In operation S322, version information of the internal software required for operating the host is obtained. Also, version information of the latest software is obtained through a cable network.

In operation S324, if the version of the internal software is not the latest version, the internal software is upgraded by using data received from a broadcasting service provider.

In operation S330, the host is verified in terms of whether the host is authorized to receive encrypted broadcasting data or not. In other words, if the host is authorized to receive the encrypted broadcasting data, operation S340 is performed. Otherwise, operation S350 is performed. If a user of the host is a high-grade broadcasting service subscriber who agreed to pay an additional broadcasting service subscription fee for a higher grade broadcasting service, the host may be verified as a host authorized to receive encrypted broadcasting data.

In operation S340, a new security client is downloaded from the broadcasting service provider that may operate a plurality of security servers to provide differentiated services according to a broadcasting service subscription fee paid by broadcasting service subscribers. In this case, the broadcasting service provider provides a security client, corresponding to a broadcasting service subscription fee a broadcasting service subscriber pays, to the host.

In operation S350, an extension application information table (XAIT) is received to obtain information regarding applications. The XAIT may include one or more types of the applications executable by the host, descriptions of the applications, and paths of the applications.

Specifically, the XAIT may include information regarding different applications according to the conditions of the host. In other words, functions provided by the host differs from a case in which the host applies security policies using a cable card to a case in which the DCAS is embodied, the types and paths of applications executable by the host also differ. Also, when the host embodies the DCAS, the types and paths of applications executable by the host also differ.

Thus, in an exemplary embodiment, the XAIT is received after performing operation S340 so as to verify current conditions of the host, that is, whether the security client is installed or not.

The broadcasting service provider may periodically transmit the XAIT via an out of band (OOB) channel. The OOB channel refers to low frequency range with a small bandwidth outside a transmitting channel used for transmitting broadcasting data. While it is not possible to transmit massive data via the OOB channel, the OOB channel is sufficient to transmit small data such as the XAIT.

If the host is unable to receive broadcasting data via the OOB channel, or the XAIT is not transmitted after a predetermined time interval, XAIT stored in the host may be used. If there is no usable XAIT, a warning message is displayed to a user, and the booting sequence may be ceased without performing the remaining operations until the XAIT is received. In contrast, if there is usable XAIT, the host upgrades application databases of applications signaled by application information stored in the XAIT.

If there is no application storage information (application_storage_descriptor), the latest initial monitoring application is installed to the host. In this case, an initial monitoring application with highest installation priority known by the XAIT is installed.

Since the XAIT includes a sequence of executing applications, the host first downloads and executes an initial monitoring application by using information obtained from the XAIT.

After the monitoring application is executed, operation S370 may not be performed until one of following situations happens: i) if 5 seconds have elapsed since a constructor of the initial monitoring application is called and a call to a monitoring configuration signal function is not made, ii) if the monitoring configuration signal function is called by authorized applications.

A DCAS manager defined in a DCAS host software (DCAS-HOST-SW) may register a security client while operation S310 is performed. A DCAS handling application may be a part of the initial monitoring application, and may be executed while the next operation below is performed or after the booting sequence is completed.

Although an inband channel cannot be used before operation is completed, the initial monitoring application can execute an application and a service before calling the monitoring configuration signal function.

In operation S370, a basic application supporting essential functions for providing a broadcasting service is executed. The basic application may be an application, prescribed by a manufacturer of the host, to be executed while the host is booted. Also, the basic application is autorun-capable and not relevant to broadcasting channels.

By using information obtained from the XAIT, it is determined whether it is necessary to download basic applications. If the stored basic applications are the latest ones, the stored applications are executed. Otherwise, if the stored basic applications are not the latest ones, the host may download and execute the latest basic applications. Also, downloaded ones may be stored in an internal storage area.

Once operation S370 is performed, the host can provide a basic broadcasting service. In other words, the host can receive input from a user and execute some applications. Also, the host can decode and output unencrypted broadcasting data. However, even if the security client is installed, an operation decrypting encrypted broadcasting data can be performed after the booting sequence is completed.

After operation S370 is completed, asynchronous events such as upgrading set of applications included in the XAIT or rebooting the host may occur. Specifically, the XAIT is verified in terms of whether the XAIT is changed or not, and, if necessary, the XAIT is upgraded. The upgrade of the XAIT is managed by an executive module, and the changing of application databases due to the change of the XAIT may be performed by the initial monitoring application. Once the aforementioned operations are completed, the host may be rebooted. After the host is rebooted, the initial monitoring application deletes all installed applications and retrieves system resources.

Figure 4:
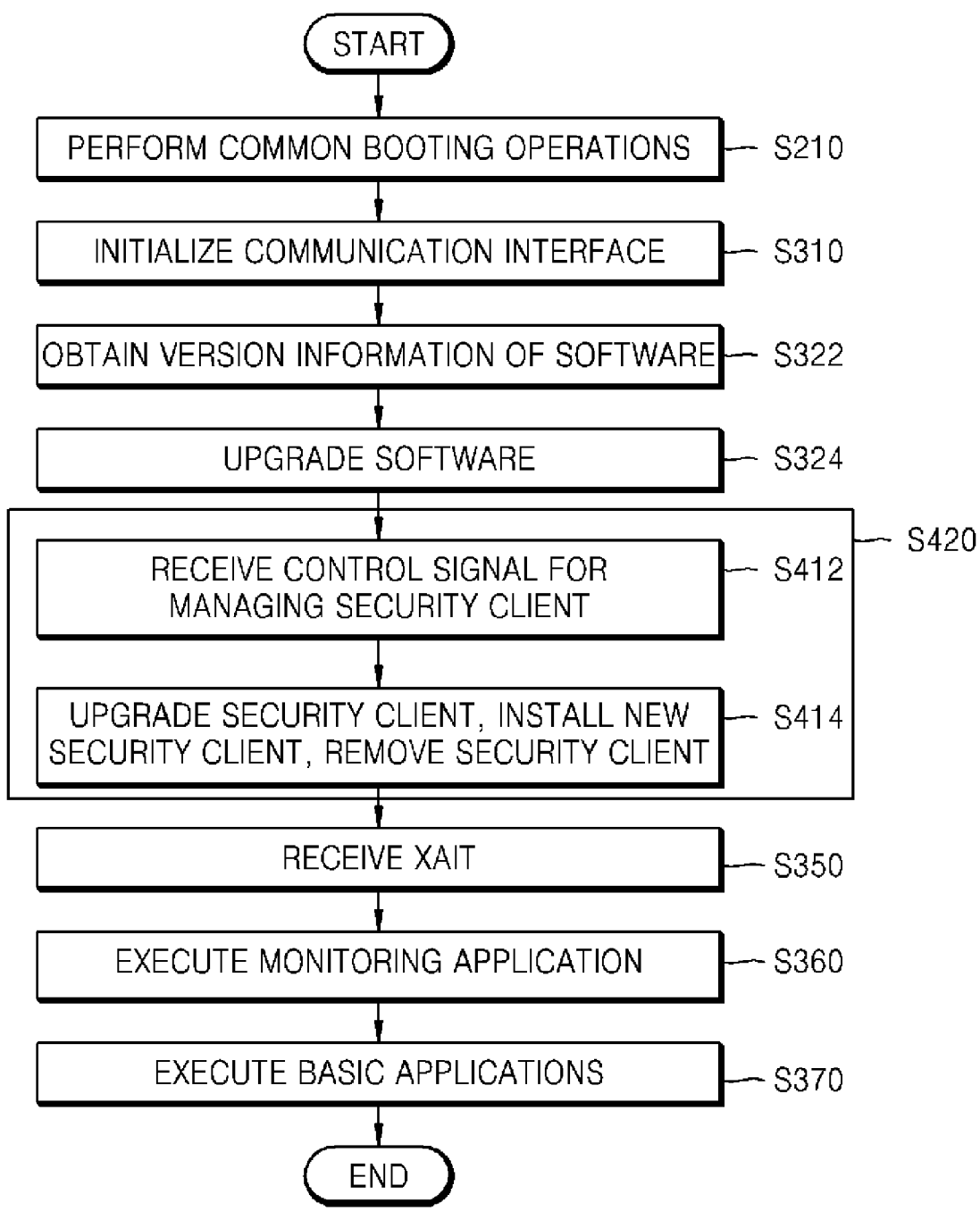
FIG. 4 is a flowchart of a host booting sequence according to another embodiment of the present invention.

FIG. 4 is a flowchart of a host booting sequence according to another embodiment of the present invention. In FIG. 4, a host is booted according to a third booting mode. The operations of FIG. 4 having the same reference numbers as those of the operations of FIG. 3 are identical to the operations of FIG. 3, and thus their descriptions will be omitted below since identical.

In operation S410, one or more of upgrading an installed security client, installing a new security client, and removing an installed security client are performed.

Operation S410 may include operations S412 and S414.

In operation S412, a control signal for managing a security client installed to a security module is received from a broadcasting service provider. The control signal refers to a signal for upgrading the security client installed to the security module, installing a new security client, and removing a security client.

In operation S414, one or more of upgrading the security client installed to the security module, installing a new security client, and removing a security client are performed according to the control signal.

Although the control signal is received from the broadcasting service provider in operations S412 and S414, the security client can be managed by comparing information regarding a new security client distributed by the broadcasting service provider and information regarding the installed security client.

For example, when the information regarding a new security client and the information regarding the installed security client are compared and the installed security client is not software distributed by a broadcasting service provider connected to a host, the host may delete the installed security client and downloads the new security client from the broadcasting service provider, because a security client distributed by a specific broadcasting service provider can only decrypt encrypted broadcasting data received from the same broadcasting service provider.

Also, if the information regarding a new security client and the information regarding the installed security client are compared and the version of the new security client is higher than that of the installed security client, the installed security client may be upgraded.

Additionally, if security policies between the host and the broadcasting service provider are changed, a security client may be changed in correspondence with the changes of the security policies. Examples of the changes of the security policies include a case in which a broadcasting service subscriber decides not to receive a paid broadcasting service and a case in which a broadcasting service subscriber wants to receive a more expensive broadcasting service. In other words, if the broadcasting service subscriber decides not to receive the paid broadcasting service, the installed security client can be removed so that the broadcasting service subscriber can receive only free broadcasting service. If the broadcasting service subscriber wants to receive the more expensive broadcasting service, the installed security client may be upgraded or a new security client may be downloaded.

Figure 5:
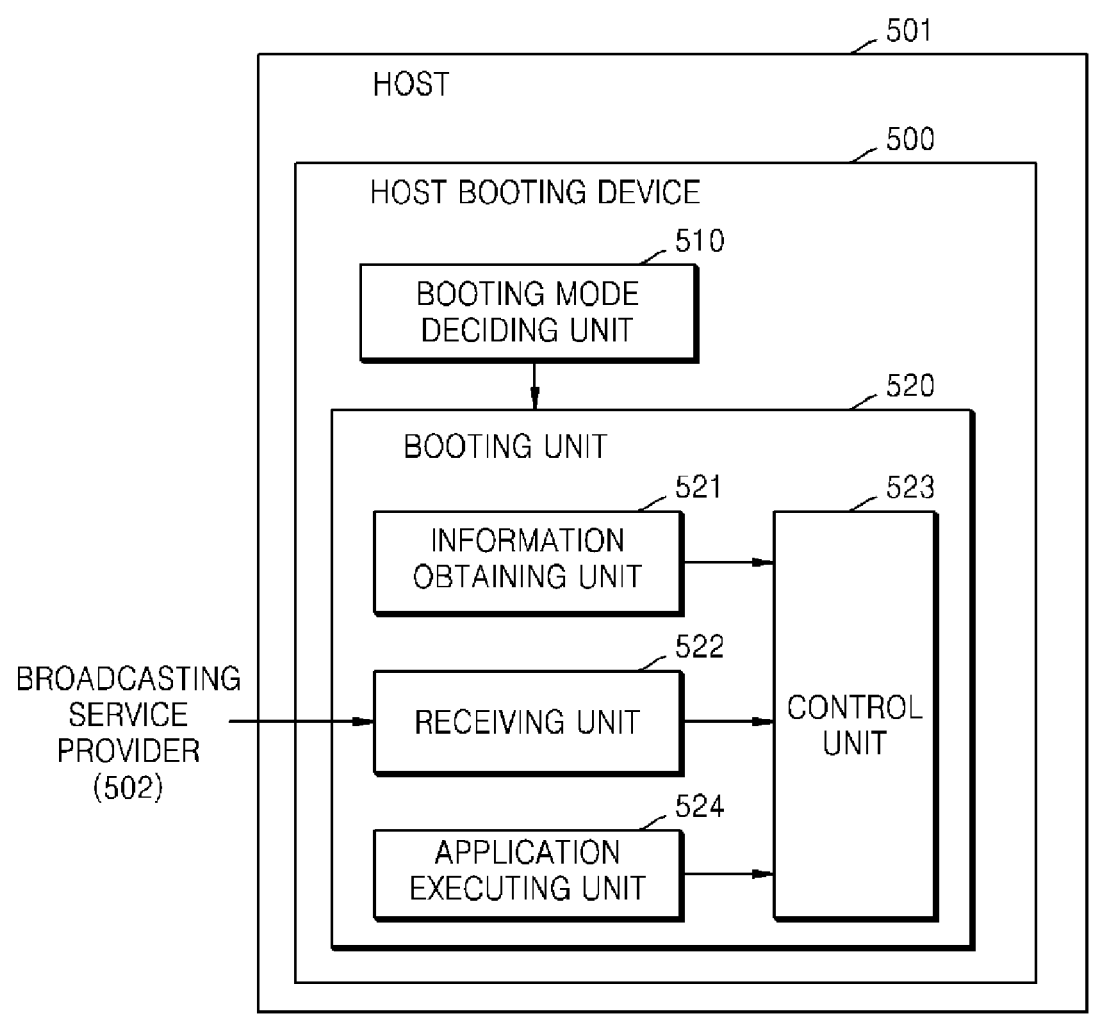
FIG. 5 is a block diagram of a host booting device according to an embodiment of the present invention.

FIG. 5 is a block diagram of a host booting device 500 according to an embodiment of the present invention. The host booting device 500 includes a booting mode deciding unit 510 and a booting unit 520.

Based on first information indicating whether a host can communicate with a broadcasting service provider and second information indicating whether a software-based security client providing information required for decrypting broadcasting data is installed to a hardware-based security module connected to the host, the booting mode deciding unit 510 decides one of a plurality of pre-determined booting modes as a booting mode of the host. The host can communicate with the broadcasting service provider via a cable network, and the security client may be a DCAS client for embodying the DCAS.

The booting modes may include a first booting mode for a case in which communication cannot be established between the broadcasting service provider and the host, a second booting mode for a case in which communication between the broadcasting service provider and the host can be established and the security client is not installed, and a third booting mode for a case in which communication between the broadcasting service provider and the host can be established and the security client is installed.

The booting unit 520 boots the host in the decided booting mode, and includes an information obtaining unit 521, a receiving unit 522, and a control unit 523.

The information obtaining unit 521 obtains information regarding internal components of the host, such as, version information of internal software required for booting the host, information regarding the security client, etc.

The receiving unit 522 receives data for upgrading internal software, a new security client, and information regarding the new security client from the broadcasting service provider.

The control unit 523 controls operations related to security policies, such as upgrading internal software and the security client, installing a new security client, and removing a new security client.

An application executing unit 524 executes an application either stored in the host or received by the receiving unit 522 so as to provide a broadcasting service.

Hereinafter, operations of the booting unit 520 in each of the booting modes will be described.

When a host 501 cannot communicate with a broadcasting service provider 502, the booting mode deciding unit 510 decides to boot the host 501 in the first booting mode.

The application executing unit 524 executes basic applications supporting functions required for providing a broadcasting service. A manufacturer of the host 501 may install the basic applications to a predetermined storage area (not shown) when the host 501 is rolled-out.

When the host 501 can communicate with the broadcasting service provider 502 and a security client is not installed to a security module, the booting mode deciding unit 510 decides to boot the host 501 in the second booting mode.

An initializing unit (not shown) within the booting unit 520 initializes a communication interface between the host 501 and the security module such that the host 501 and the security module can communicate with each other, and then, the initializing unit updates software required to operate the host 501. To determine whether it is necessary to update the software or not, the information obtaining unit 521 obtains version information of the internal software required for operating the host 501. The control unit 523 verifies whether the version of the internal software stored in the host 501 is the latest or not. If the version of the internal software stored in the host 501 is not the latest one, the control unit 523 controls the host 501 so that the internal software is updated.

A new security client is selectively installed to the host 501. The host booting device 500 may further include a determining unit (not shown) determining whether a user of the host 501 is a high-grade broadcasting service subscriber or not. In other words, the determining unit determines whether the host 501 is authorized to receive encrypted broadcasting data provided by the broadcasting service provider 502 or not. If the host 501 is determined as authorized to receive encrypted broadcasting data, the control unit 523 controls the host 501 such that a new security client provided by the broadcasting service provider 502 is installed to a security module. Meanwhile, if the host 501 is determined as not authorized to receive encrypted broadcasting data, the new security client is not installed.

The receiving unit 522 may further include an information receiving unit (not shown) and an application receiving unit (not shown).

The information receiving unit receives information regarding applications which will be selectively executed by the host 501, from the broadcasting service provider 502. The information regarding the applications may be included in the XAIT and received by XAIT. The XAIT includes information regarding the types and paths of applications which can be received by the host 501 according to the conditions of the host 501, wherein the conditions of the host 501 includes whether the host 501 can communicate with the broadcasting service provider 502 or not, whether a cable card is used or not, whether a DCAS is used, and whether a security client is installed to a security module in case of using the DCAS.

The application receiving unit receives applications by using the received information of applications, and a monitoring application is received primarily. The monitoring application is an application for controlling other applications, and is downloaded primarily.

Once the monitoring application is downloaded, the application executing unit 524 executes the monitoring application and sequentially executes basic applications.

When the host 501 can communicate with the broadcasting service provider 502 and a security client is not installed to a security module, the booting mode deciding unit 510 decides that the host 501 will be booted in the third booting mode.

As described above, the booting unit 520 performs the initialization of the communication interface between the host 501 and the security module and upgrades software.

The broadcasting service provider 502 can transmit a control signal to the host 501 so as to manage the security client. The control signal may refer to a signal for upgrading the security client installed to the security module, installing a new security client, and removing a security client.

When the receiving unit 522 receives the control signal, the control unit 521 controls the host 501 so that one or more of upgrading an installed security client, installing a new security client, and removing an installed security client are performed.

Afterward, same as a case in which it is decided that the host 501 is to be booted in the second booting mode, the booting unit 520 sequentially performs receiving and parsing information regarding applications, executing a monitoring application, and executing basic applications.

Figure 6:
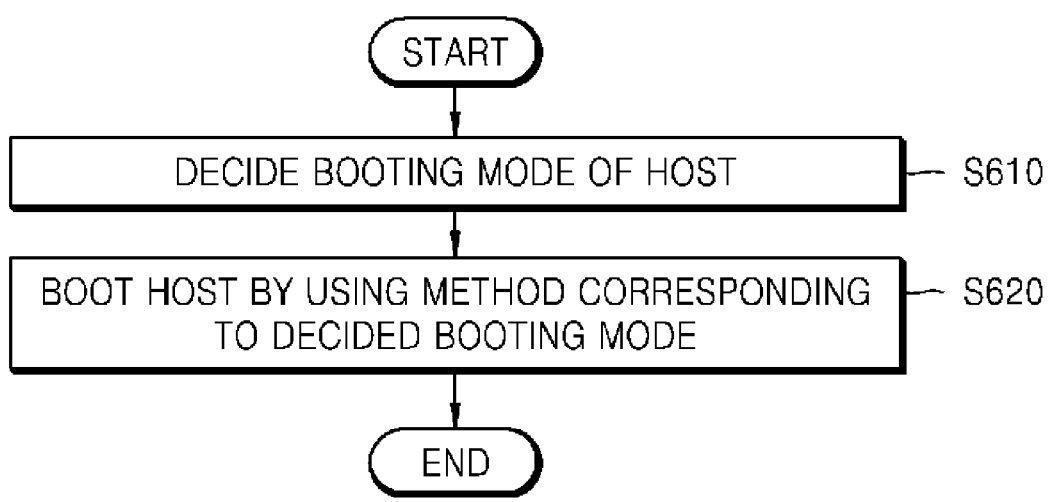
FIG. 6 is a flowchart of a method of booting a host, according to an embodiment of the present invention.

FIG. 6 is a flowchart of a method of booting a host, according to an embodiment of the present invention.

In operation S610, based on a first information indicating whether a host can communicate with a broadcasting service provider and second information indicating whether a software-based security client providing information required for decrypting broadcasting data is installed to a hardware-based security module connected to the host, one of a plurality of pre-determined booting modes is decided as a booting mode of the host.

The booting modes may include a first booting mode for a case in which communication cannot be established between the broadcasting service provider and the host, a second booting mode for a case in which communication between the broadcasting service provider and the host can be established and the security client is not installed, and a third booting mode for a case in which communication between the broadcasting service provider and the host can be established and the security client is installed.

In operation 620, the host is booted in the decided booting mode.

As a host is booted in a different booting mode according to the conditions of the host, the host can be booted optimally for functions provided by the host.

By performing upgrading of a security client, installing a new security client, and removing a new security client, prior to receiving information regarding applications, a necessary application can be obtained easily by using information regarding the applications.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). Other examples of the computer readable recording medium may include storage media such as carrier waves (e.g., transmission through the Internet).

While this invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of booting a host providing a broadcasting service, the method comprising:
    deciding one of a plurality of pre-determined booting modes as a booting mode of the host based on a first information indicating whether a host can communicate with a broadcasting service provider and second information indicating whether a software-based security client providing information required for decrypting broadcasting data is installed in a hardware-based security module connected to the host; and
    booting the host in the booting mode of the host.

2. The method of claim 1, wherein the plurality of pre-determined booting modes comprises one or more of a first booting mode for a case in which communication cannot be established between the broadcasting service provider and the host, a second booting mode for a case in which communication between the broadcasting service provider and the host can be established and the software-based security client is not installed, and a third booting mode for a case in which communication between the broadcasting service provider and the host can be established and the software-based security client is installed.

3. The method of claim 2, wherein, if the booting mode of the host is the second booting mode or the third booting mode, the booting of the host comprises: initializing a communication interface between the host and the hardware-based security module; determining whether a version of internal software for operating the host is a latest version or not; and upgrading the internal software by using data provided by the broadcasting service provider if the version of the internal software is not the latest version.

4. The method of claim 3, wherein, if the booting mode of the host is the third booting mode, the booting of the host further comprises:
    receiving a control signal for managing the installed software-based security client; and
    performing one or more of upgrading the installed software-based security client, installing a new software-based security client distributed by the broadcasting service provider, and removing the installed software-based security client based on the control signal.

5. The method of claim 3, wherein, if booting mode of the host is the second booting mode, the booting of the host further comprises:
    determining whether the host is authorized to receive encrypted broadcasting data provided by the broadcasting service provider; and
    downloading a new software-based security client distributed by the broadcasting service provider and installing the new software-based security client to the security module, in case where the host is determined as authorized to receive the encrypted broadcasting data.

6. The method of claim 5, wherein the booting of the host further comprises:
    receiving information regarding applications which will be selectively executed by the host;
    receiving a monitoring application controlling other applications based on the information regarding the applications; and
    executing the received monitoring application.

7. The method of claim 6, wherein the information regarding the applications is in an extension application information table (XAIT).

8. The method of claim 6, wherein the booting of the host further comprises executing basic applications supporting functions required for providing the broadcasting service.

9. The method of claim 1, wherein the host is connected to the broadcasting service provider via a cable network, and the security client is a conditional access system (CAS) client for embodying a CAS.

10. The method of claim 1, wherein the hardware-based security module is installed inside the host as a chipset.

11. A device for booting a host providing a broadcasting service, the device comprising:
    a booting mode deciding unit which decides one of a plurality of pre-determined booting modes as a booting mode of the host based on first information indicating whether a host can communicate with a broadcasting service provider and second information indicating whether a software-based security client providing information required for decrypting broadcasting data is installed to a hardware-based security module connected to the host; and
    a booting unit which boots the host in the decided booting mode of the host.

12. The device of claim 11, wherein the plurality of pre-determined booting modes comprises one or more of a first booting mode for a case in which communication cannot be established between the broadcasting service provider and the host, a second booting mode for a case in which communication between the broadcasting service provider and the host can be established and the software-based security client is not installed, and a third booting mode for a case in which communication between the broadcasting service provider and the host can be established and the software-based security client is installed.

13. The device of claim 12, wherein, the booting unit comprises:
    an initializing unit which initializes a communication interface between the host and the hardware-based security module if the decided booting mode of the host is the second booting mode or the third booting mode;
    an information obtaining unit which obtains version information of internal software for operating the host;
    a receiving unit which receives data for upgrading the internal software, from the broadcasting service provider; and
    a control unit which controls the host such that the internal software is upgraded by using the received data if the version of the internal software is not the latest version.

14. The device of claim 13, wherein, the receiving unit further receives a control signal for managing the installed software-based security client when decided that the host is to be booted in the third booting mode, and the control unit controls the host so that one or more of upgrading the installed software-based security client, installing a new software-based security client distributed by the broadcasting service provider, and removing the installed software-based security client are performed based on the control signal.

15. The device of claim 13, further comprising a determining unit which determines whether the host is authorized to receive encrypted broadcasting data provided by the broadcasting service provider if the booting mode of the host is the second booting mode, wherein the receiving unit further receives a new software-based security client distributed by the broadcasting service provider if the host is determined as authorized to received the encrypted broadcasting data, and the control unit controls the host so that the downloaded new software-based security client is installed to the hardware-based security module.

16. The device of claim 14, wherein the receiving unit further comprises:

an information receiving unit which receives information regarding applications, which will be selectively executed by the host, from the broadcasting service provider; and an application receiving unit which receives a monitoring application used for controlling one or more of the applications based on the information regarding the applications, wherein the device for booting a host further comprises an application executing unit which executes the received monitoring applications.

17. The device of claim 16, wherein the information regarding the applications is comprised in an extension application information table (XAIT).

18. The device of claim 16, wherein the application executing unit further executes basic applications supporting functions required for providing the broadcasting service.

19. The device of claim 11, wherein the host is connected to the broadcasting service provider via a cable network, and the software-based security client is a CAS (conditional access system) client for embodying a CAS.

20. The device of claim 11, wherein the hardware-based security module is installed inside the host as a chipset.

21. A computer non-transitory recording medium recorded thereon the method of claim 1.

* * * * *